April 15, 1952

R. D. CANFIELD ET AL 2,592,654

ELECTRICAL PEST DESTROYER

Filed Dec. 21, 1950

INVENTORS
RICHARD D. CANFIELD
and EDGAR E. CANFIELD
BY
McMorrow, Berman & Davidson
ATTORNEYS April 15, 1952 R. D. CANFIELD ET AL 2,592,654
ELECTRICAL PEST DESTROYER
Filed Dec. 21, 1950 2 SHEETS—SHEET 2
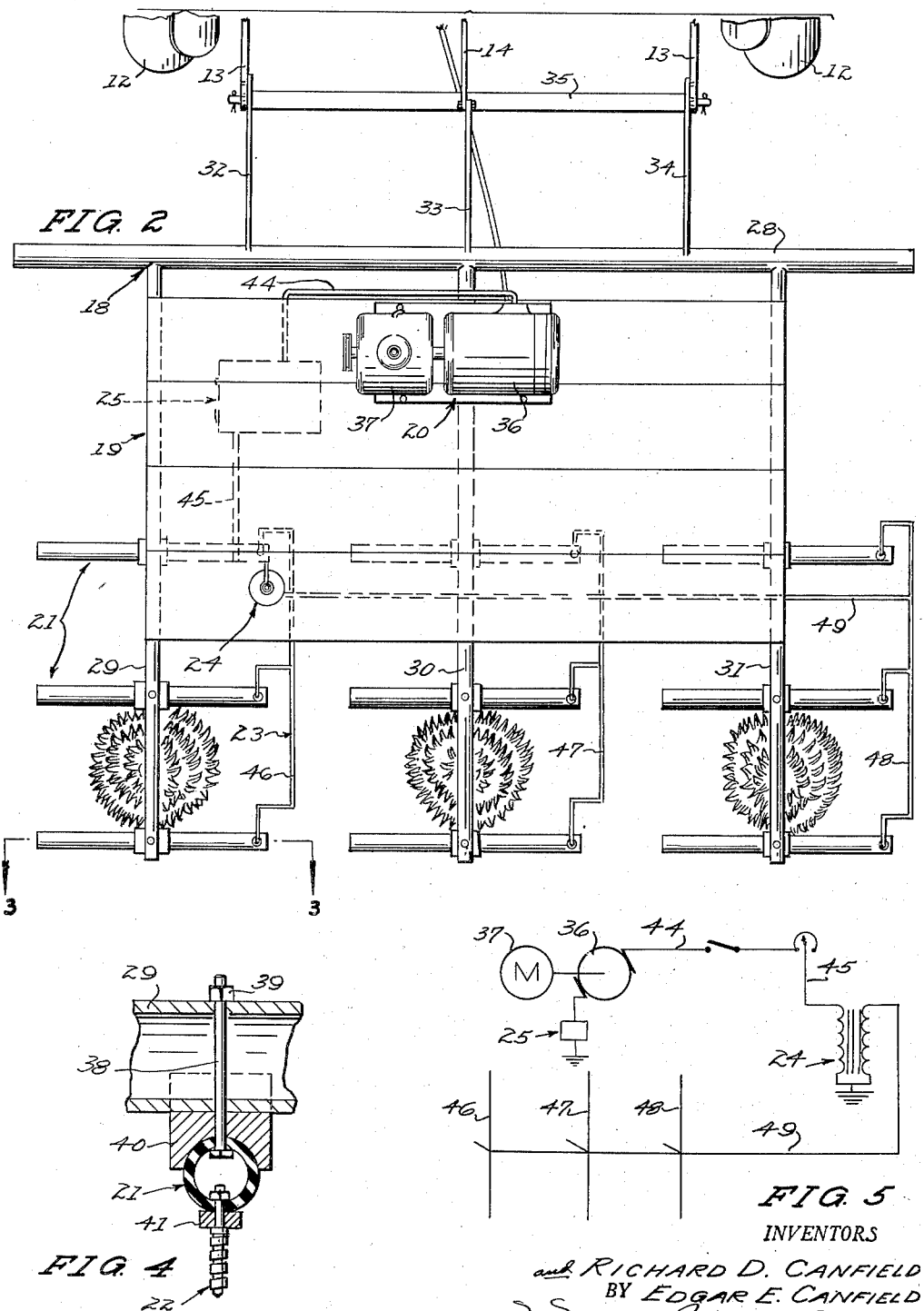
INVENTORS
RICHARD D. CANFIELD
BY EDGAR E. CANFIELD
ATTORNEYS Patented Apr. 15, 1952

2,592,654

UNITED STATES PATENT OFFICE 2,592,654

ELECTRICAL PEST DESTROYER

Richard D. Canfield and Edgar E. Canfield, Albertville, Ala.

Application December 21, 1950, Serial No. 202,078

4 Claims. (Cl. 43—132)

1

This invention relates to agricultural pest destroyers and more particularly to a device for electrically destroying agricultural pests, such as boll weevil in cotton.

It is among the objects of the invention to provide an improved pest or insect destroying device which can be mounted on a mobile machine, such as an agricultural tractor, without modification of the tractor construction, and transporated over an agricultural crop, such as cotton, to destroy pests or insects, such as boll weevil, in the crop, which electrically destroys the insects without permanent injury to the crop, which includes its own generator plant for supplying electrical energy, which will treat several rows of a row crop at the same time, and which is simple and durable in construction, economical to manufacture, and positive and effective in use.

Other objects and advantages will become apparent from a consideration of the following description and the appended claims in conjunction with the accompanying drawings wherein:

Figure 2 is a top plan view of the device illustrated in Figure 1;

Figure 4 is a fragmentary cross sectional view on the line 4—4 of Figure 3; and

Figure 5 is a wiring diagram for the electrical part of the mechanism.

Figure 1:
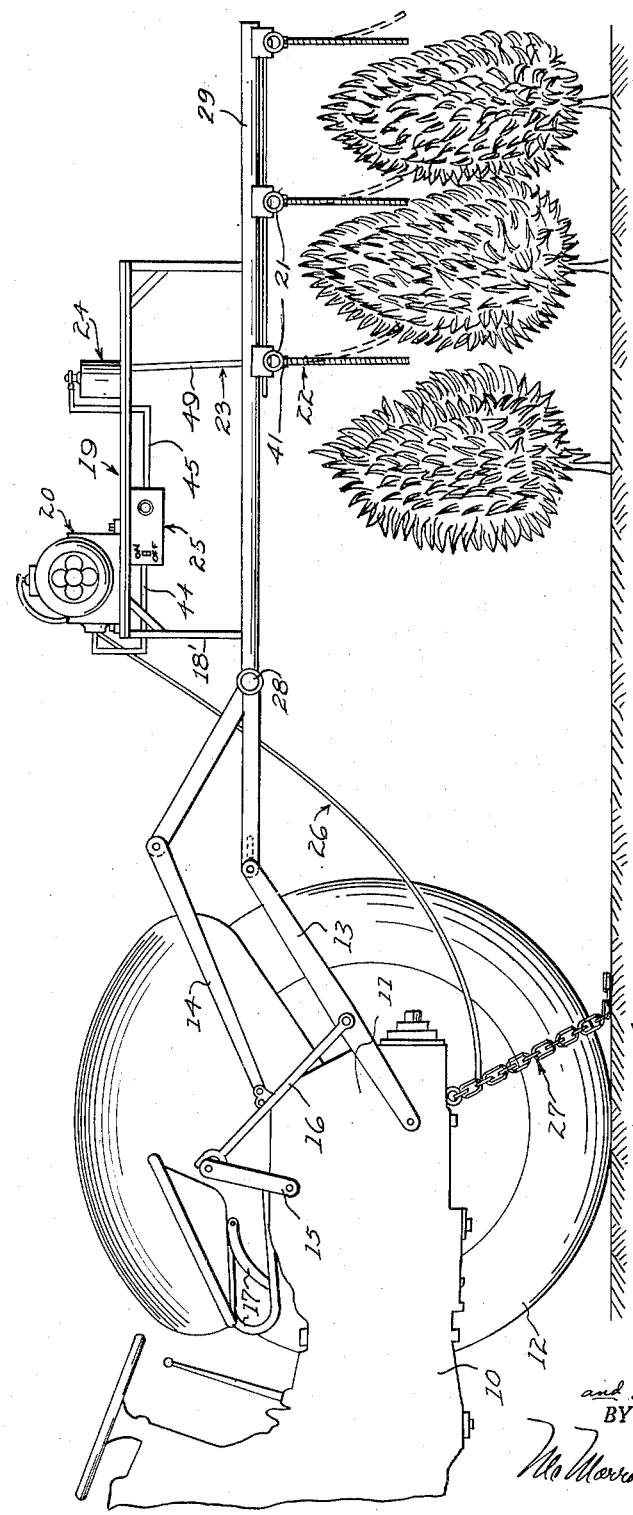
Figure 1 is a side elevational view of a pest destroying device illustrative of the invention shown operatively mounted on an agricultural tractor, the manner of applying electrical energy to the plant crops being diagrammatically illustrated.

With continued reference to the drawings, the tractor diagrammatically illustrated is of the type marketed as a "Ford," "Ford-Ferguson" or "Ferguson" tractor and includes a frame 10, the rear end of which includes a differential unit 11 disposed at the center of a rear axle carrying the rear traction wheels 12 of the tractor. A pair of tension links 13 are pivotally connected at their forward ends to the diffrential unit of the tractor and extend rearwardly of the tractor in spaced apart relationship to each other for connection at their rearward ends to a tractor towed implement. A compression link 14 is connected at its forward end to the top of the differential unit and extends rearwardly of the tractor for connection at its rear end to a bracket mounted on the implement connected to the tension links 13. A lift shaft having lift arms 15 thereon extends through the upper portion of the tractor frame

2

10 with the lift arms disposed at respectively opposite sides of the frame and the distal end of each lift arm is connected to a corresponding tension link 13 intermediate the length of the latter by a strut 16. The lift shaft is connected to hydraulic lift mechanism included in the frame of the tractor and not illustrated, and automatic control of the hydraulic mechanism is provided by the connection between the compression link 14 and the tractor frame or differential unit in a manner well known to the art. A manual control for the mechanism is also provided, as indicated at 17, for manually raising and lowering the rear ends of the tension links 13 and this manual control may be utilized to support an implement or device connected to the rear ends of the tension links 13 and compression link 14 at various selected elevations relative to the tractor.

As the form of tractor diagrammatically illustrated is well known to the art, and as the pest destroying device of the invention may be carried by other forms of tractors and different mobile machines, a more detailed illustration and description of the tractor is considered unnecessary for the purposes of the present invention.

The pest destroying device of the invention comprises a main frame generally indicated at 18, a platform 19 supported above the main frame 18 by a sub-frame 18', a power operated generator 20 mounted on the platform, a plurality of bars 21 of electrically insulative material secured to the under side of the frame at spaced apart locations relative to each other, flexible fingers 22 of electrically conductive material secured to and depending from each bar 21 at spaced apart intervals therealong, conductor means 23 connecting one side of the generator to the flexible fingers 22, a current converter or transformer 24 and a voltage regulating switch 25 interposed in the conductor 23 and means 26 and 27 providing a ground connection for the other side of the generator.

The device illustrated is arranged to treat three rows of crop plants at the same time, and in this arrangement, the platform comprises a tubular beam 28 which extends transversely of the tractor rearwardly of the rear tractor wheels 12 and three tubular arms 29, 30 and 31 secured at their forward ends to the beam 28 and extending rearwardly from this beam in spaced apart and substantially parallel relationship to each other, the center lines of the beam and the three arms being disposed substantially in a common plane. The middle arm 30 is located substantially at the mid-length location of the beam 28 and the outside arms 29 and 31 are disposed at respectively opposite sides of the middle arm 30 and spaced substantially equal distances from the latter.

Three elongated bracket members 32, 33 and 34 are secured to the beam 28 at the side of the latter opposite the arms 29, 30 and 31.

The two outside bracket members 32 and 34 have their center lines substantially in a common plane which also includes the center line of the beam 28 and the middle bracket member 33 inclines upwardly and forwardly from the beam 28 away from this last mentioned plane. The middle bracket member 33 is located substantially at the mid-length location of the beam 28 and is connected at its forward end to the rearward end of the compression link 14 of the hitch mechanism of the tractor and the outside bracket members 32 and 34 are spaced substantially equal distances from the member 33 and at respectively opposite sides of the later. These outside bracket members are connected at their forward ends to the rear ends of the tension links 13 by the hitch bar 35 of the tractor.

With this arrangement, the frame 18 is supported by the hitch mechanism of the tractor in substantially horizontal position above the ground and can be raised and lowered by the implement lift mechanism of the tractor to support it at the proper level above the crop plants.

The platform 19 may conveniently comprise a plurality of light boards or a suitable piece of plywood mounted on the arms 29, 30 and 31, somewhat rearwardly of the beam 28 and rigidly secured to the frame arms. The generator assembly 20 comprises a 110 volt alternating current generator 36 driven by a suitable power plant, such as the gasoline engine 37, and this assembly is mounted on the platform 19 preferably adjacent the beam 28 to reduce the cantilever load imposed by its weight on the tractor hitch mechanism.

The bars 21 are tubular members of electrically insulative material and three of these bars are secured to each frame arm at spaced apart locations along the arm and at the under side of the latter. The bars are disposed perpendicular to the corresponding arms and all of the bars have their longitudinal center lines substantially in a common plane which is spaced slightly below and substantially parallel to the plane including the longitudinal center lines of the arms and the beams 28. One bar is secured to each arm near the rear end of the arm and the two other bars secured to each arm are disposed forwardly of the rear bar with the intervals between adjacent bars substantially equal. The bars are connected to the arms substantially at the mid-length locations of the bars and the length of the bars is such that the adjacent ends of the bars secured to adjacent arms are spaced apart, as is clearly illustrated in Figure 2.

Figure 3:
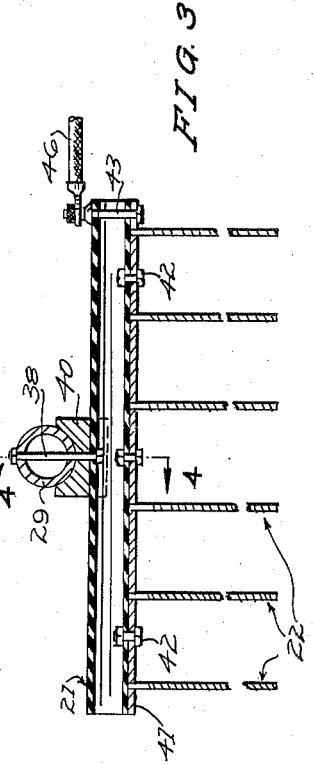
Figure 3 is a cross sectional view on an enlarged scale on the line 3—3 of Figure 2.

As is particularly illustrated in Figures 3 and 4, each tubular bar 21 is connected to the corresponding arm, such as the arm 29, by a bolt 38 which extends through an aperture in the bar 21 and through registering apertures in the corresponding tubular arm with its head disposed in the tubular bar 21 and a nut 39 threaded onto its end projecting above the top of the arm. A block 40 of electrically insulative material, such as wood, has in one side an arcuate groove receiving the lower portion of the corresponding arm and has in its opposite side an arcuate groove disposed at right angles to the arm receiving groove and receiving the upper portion of the corresponding bar 21, the bolt 38 passing through a substantially central aperture in the block 40. This connection secures each bar to its corresponding arm against movement relative to the arm.

The flexible fingers 22 are secured at their upper ends to the bars 21 and depend therefrom, as is clearly illustrated in Figures 1, 3 and 4.

In the arrangement illustrated, six fingers are secured to each bar at uniformly spaced apart intervals along the bar and the upper ends of the fingers are secured to a bus bar 41 which extends along the bottom side of the finger supporting bar 21. The bus bar is secured to the finger supporting bar 21 by spaced apart bolts 42 extending through registering apertures in the bus bar and the finger supporting bar and an electric terminal bolt 43 extends through one end of each finger supporting bar and through the corresponding end of the associated bus bar.

The fingers 22 are elongated flexible members of electrically conductive material and are connected to the corresponding bus bar 41 in a manner to provide electrically conductive connections between the bus bar and the depending fingers.

One side of the generator 36 is connected to the combined manual switch and voltage regulator 25 by a conductor 44 and the voltage regulator is connected to the primary side of the transformer 24 by a conductor 45. The three bus bars carried by each arm of the frame are connected together by a common conductor, as indicated at 46, 47 and 48 in Figure 2, and these three conductors 46, 47 and 48 are all connected to the secondary side of the transformer 24 by a common conductor 49.

The grounding element 27 may constitute a heavy chain connected to the tractor and dragging at one end on the ground and the electric conductor 26 connects the other side of the generator to this chain to provide a ground connection for the other side of the generator. Both sides of the transformer are also grounded at their ends opposite those to which the conductors 45 and 49 are connected.

When the generator is in operation, producing alternating current electrical energy, this current is suplied to the transformer 24 which steps up the voltage of the alternating current which is then supplied through the conductors 49, 46, 47 and 48 and the several bus bars 41 to the depending fingers 22. When the device is moved by the supporting tractor over crop plants, the depending flexible fingers 22 contact the plants and the plants complete the generator circuit from the fingers 22 to the ground. As the fingers pass over the plants they contact insects, such as boll weevil, on the plants, and cause these insects to become part of the electric circuit, the electric current passing through the insects being sufficient to kill the insects.

If it is desired to use direct current on the plants a suitable converter can be used in substitution for or in combination with the transformer.

The voltage regulator 25 and the transformer 24 may be regulated to cause an output of current at substantially the same voltage as that of the generator, that is, 110 volts, or may be adjusted to vary this voltage in acordance with the condition of the plants and the incrustation to be destroyed.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with an agricultural tractor having hitch means and lift means connected to said hitch means, pest destroying mechanism connected to said hitch means to be supported at selected elevations by said lift means and comprising a rectangular frame secured at one end to said hitch means, a platform supported on said frame, bars of electrically insulative material secured to the under side of said frame in spaced apart relationship to each other, flexible fingers of electrically conductive material secured to each bar and depending therefrom at spaced apart intervals therealong, a power driven generator mounted on said platform, insulative conductors connecting one side of said generator to said flexible fingers, and means providing a ground connection for the other side of said generator, said fingers being engageable with crop plants to pass electric current therethrough at sufficient voltage to kill insects on the plants.

2. A device for destroying agricultural pests comprising a frame including a beam attachable to a mobile machine and a plurality of arms secured each at one end to said beam at uniformly spaced apart locations along the latter and extending in substantially the same direction from said beam with their longitudinal center lines substantially in a common plane which also includes the longitudinal center line of said beam, a plurality of bars of electrically insulative material secured to each arm at spaced apart locations therealong and disposed substantially parallel to said beam with their longitudinal center lines substantially in a plane parallel to and spaced below the first mentioned plane, a bus bar extending along each bar and electrically insulated from said frame, a plurality of flexible fingers of electrically conductive material secured to each bus bar at spaced apart locations therealong and depending therefrom, an engine driven generator mounted on said frame, conductor means connecting one side of said generator to all of the bus bars, and means providing a ground connection for the other side of said generator.

3. A device for destroying agricultural pests comprising a frame including a beam attachable to a mobile machine and a plurality of arms secured each at one end to said beam at uniformly spaced apart locations along the latter and extending in substantailly the same direction from said beam with their longitudinal center lines substantially in a common plane which also includes the longitudinal center line of said beam, a plurality of bars of electrically insulative material secured to each arm at spaced apart locations therealong and disposed substantially parallel to said beam with their longitudinal center lines substantially in a plane parallel to and spaced below the first mentioned plane, a bus bar extending along each bar of electrically insulative material and electrically insulated from said frame, a plurality of flexible fingers of electrically conductive material secured to each bus bar at spaced apart locations therealong and depending therefrom, an engine driven generator mounted on said frame, conductor means connecting one side of said generator to all of the bus bars, and means providing a ground connection for the other side of said generator, said bars of electrically insulative material being secured substantially at their mid-length locations to the corresponding arms and having a length such that the adjacent ends of bars carried by adjacent arms are spaced apart between the adjacent arms.

4. A device for destroying agricultural pests comprising a frame including a beam attachable to a mobile machine and a plurality of arms secured each at one end to said beam at uniformly spaced apart locations along the latter and extending in substantially the same direction from said beam with their longitudinal center lines substantially in a common plane which also includes the longitudinal center line of said beam, a plurality of bars of electrically insulative material secured to each arm at spaced apart locations therealong and disposed substantially parallel to said beam with their longitudinal center lines substantially in a plane parallel to and spaced below the first mentioned plane, a bus bar extending along each bar and electrically insulated from said frame, a plurality of flexible fingers of electrically conductive material secured to each bus bar at spaced apart locations therealong and depending therefrom, an engine driven generator mounted on said frame, conductor means connecting one side of said generator to all of the bus bars, and means providing a ground connection for the other side of said generator, said conductor means including a voltage increasing transformer and said means providing a ground connection including a generator voltage regulating switch.

RICHARD D. CANFIELD.
EDGAR E. CANFIELD.

REFERENCES CITED

The following references are of record in the file of this patent:

UNITED STATES PATENTS

| Number | Name | Date |
| --- | --- | --- |
| 779,791 | Lokuciejewsky | Jan. 10, 1905 |
| 2,029,225 | Ekre | Jan. 28, 1936 |
| 2,182,230 | Hoffman | Dec. 5, 1939 |